US008112789B2

(12) United States Patent
Halls et al.

(10) Patent No.: US 8,112,789 B2
(45) Date of Patent: Feb. 7, 2012

(54) SYSTEMS AND METHODS FOR FACILITATING DISTRIBUTED AUTHENTICATION

(75) Inventors: David Halls, Bucks (GB); Chris Mayers, Bucks (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 1081 days.

(21) Appl. No.: 11/539,202

(22) Filed: Oct. 6, 2006

(65) Prior Publication Data

US 2007/0107048 A1    May 10, 2007

Related U.S. Application Data

(60) Provisional application No. 60/725,904, filed on Oct. 11, 2005.

(51) Int. Cl.
    *H04L 29/06* (2006.01)
(52) U.S. Cl. .............................................. 726/4; 726/10
(58) Field of Classification Search .................. 726/3, 4, 726/10
    See application file for complete search history.

(56) References Cited

U.S. PATENT DOCUMENTS

| | | | |
|---|---|---|---|
| 6,253,327 B1 | 6/2001 | Zhang et al. | |
| 6,871,346 B1 | 3/2005 | Kumbalimutt et al. | |
| 7,036,142 B1 | 4/2006 | Zhang et al. | |
| 2002/0083336 A1* | 6/2002 | Bradford et al. | 713/201 |
| 2003/0018913 A1* | 1/2003 | Brezak et al. | 713/201 |
| 2005/0132189 A1* | 6/2005 | Katsube et al. | 713/168 |

OTHER PUBLICATIONS

Gittler, et al., The DCE Security Service, Hewlett-Packard Journal, Hewlett-Packard Co., Palo Alto, US, vol. 46, No. 6, pp. 41-48, XP0005811254, 1995.
International Search Report, PCT/US2006/039308, mailed on Jun. 29, 2007.
Microsoft Windows NT Server Active Directory Service Interfaces: The Easy Way to Access and Manage LDAP-Based Directories, Microsoft Windows NT Server, pp. 1-17, XP000863814, 1997.
Written Opinion of the International Searching Authority, PCT/US2006/039308, mailed on Jun. 29, 2007.

\* cited by examiner

*Primary Examiner* — Kambiz Zand
*Assistant Examiner* — Amare F Tabor
(74) *Attorney, Agent, or Firm* — Foley & Lardner LLP; John D. Lanza

(57) ABSTRACT

A method for facilitating distributed authentication includes the step of requesting, by a user of a client machine residing in a first domain, access to a resource residing in a second domain. The client machine authenticates the user to an intermediate machine. The intermediate machine impersonates the client machine. The intermediate machine impersonating the client machine requests access to the second domain from a domain controller residing in the second domain. The domain controller authorizes the requested access, responsive to a determination that the impersonated client machine is trusted for delegation. The domain controller transmits to an application server residing in the second domain, authentication data associated with the impersonated client machine. The application server transmits, to the intermediate machine, a launch ticket uniquely identifying a logon token. The client machine provides, to the application server, the launch ticket to access the resource residing in the second domain.

33 Claims, 7 Drawing Sheets

SYSTEMS AND METHODS FOR FACILITATING DISTRIBUTED AUTHENTICATION

RELATED APPLICATIONS

The present application claims priority to U.S. Provisional Patent Application Ser. No. 60/725,904, entitled "Systems and Methods for Facilitating Distributed Authentication," filed Oct. 11, 2005, which is incorporated herein by reference.

FIELD OF THE INVENTION

The present invention relates to methods and systems for authentication. In particular, the present invention relates to systems and methods for facilitating distributed authentication.

BACKGROUND OF THE INVENTION

Servers, including presentation servers such as Microsoft Terminal Services and those interacting with Citrix MetaFrame, generally require users to authenticate before granting users access to resources provided by the servers. Servers may be accessed remotely, from a client machine, using a specialized presentation server protocol such as Citrix ICA, Microsoft RDP, or the X protocol.

When a user authenticates directly to a server, the server may use the authentication information the user provided (e.g. a password or certificate) to verify the user's identity. However, in some circumstances, the user will authenticate to a third-party component instead of directly to the server. One reason for authenticating to a third-party component is that, the user may not trust the server with his or her credentials and may not want to provide his or her credentials to the server. Another reason for authenticating to a third-party component is that the user may be in a different security scope than the server. In this case, the user may not have any credentials acceptable to the server because policies of the organization hosting the server may not allow issuance of credentials to external users.

However, authenticating to a third-party component instead of to a server may create several problems. Although a trust relationship may exist between the third-party component and the server (e.g. by using certificates), the server may not trust the third-party component to authenticate a user on behalf of the server. In some circumstances, conventional systems lack the means for the server to use existing user authentication credentials or assertions of a user's identity made by the trusted third-party components to authenticate the user to the server or to authorize the user to access non-web-based resources. In other circumstances, the available credentials associated with the user do not comply with the requirements of the server. For example, a user may have a ticket or certificate but the server accepts only a user name and password. Methods for enabling delegated remote authentication using assertions of identity from trusted third-party components would be desirable.

SUMMARY OF THE INVENTION

In one aspect, a method for facilitating distributed authentication includes the step of requesting, by a user of a client machine residing in a first domain, access to a resource residing in a second domain. The client machine authenticates the user to an intermediate machine. The intermediate machine impersonates the client machine. The intermediate machine impersonating the client machine requests access to the second domain from a domain controller residing in the second domain. The domain controller authorizes the requested access to the second domain, responsive to a determination that the impersonated client machine is trusted for delegation. The domain controller transmits, to an application server residing in the second domain, authentication data associated with the impersonated client machine. The application server transmits, to the intermediate machine a launch ticket uniquely identifying a logon token. The client machine provides, to the application server, the launch ticket to access the resource in the second domain. In one embodiment, the client machine receives, from the application server, output data generated by an execution of the resource.

In one embodiment, the user, having an account in a third domain, requests, via the client machine residing in the first domain, access to a resource residing in the second domain. In another embodiment, the user, having an account in the first domain, requests, via the client machine residing in the first domain, access to a resource residing in the second domain. In still another embodiment, the user of the client machine residing in the first domain requests access to a WINDOWS application program executed by an application server residing in the second domain. In yet another embodiment, the user of the client machine provides authentication credentials to the client machine, the authentication credentials associated with an account associated with the user in the first domain. In a further embodiment, the user of the client machine provides authentication credentials to the client machine, the authentication credentials associated with the user in a third domain.

In another embodiment, the client machine authenticates the user to the intermediate machine using Active Directory Federation Services. In still another embodiment, the client machine transmits an Active Directory Federation Services claim associated with the user to the intermediate machine, via a plurality of intermediate machines. In even still another embodiment, the client machine authenticates the user to the intermediate machine using Integrated Authentication. In yet another embodiment, the intermediate machine uses an Active Directory Federation Services component to impersonate the client machine. In a further embodiment, the domain controller generates, and transmits to the application server, WINDOWS authentication credentials associated with the user.

In another aspect, a system for facilitating distributed authentication includes a client machine, an intermediate machine, a domain controller, and an application server. The client machine, residing in a first domain, requests access to a resource residing in a second domain. The intermediate machine receives, from the client machine, authentication credentials associated with a user of the client machine; authenticates the user; and impersonates the client machine. The domain controller, residing in the second domain, receives a request for access to the second domain from the intermediate machine impersonating the client machine and determines that the impersonated client machine is trusted for delegation. The application server receives, from the domain controller, authentication data associated with the impersonated client machine with a request for access to the resource on the second domain and transmits, to the intermediate machine impersonating the client machine, a launch ticket uniquely identifying a logon token. The client machine provides the launch ticket to the application server to access the resource residing in the second domain.

In one embodiment, the client machine comprises a transmitter sending a request for access to a resource residing in the second domain for a user having an account on the first domain. In another embodiment, the client machine comprises a transmitter sending a request for access to a resource residing in the second domain for a user having an account on a third domain. In still another embodiment, the client machine comprises a transmitter sending a request for access to a WINDOWS application program executed by an application server residing in the second domain.

In one embodiment, the intermediate machine comprises an authentication component for authenticating the user of the client machine using Active Directory Federation Services. In another embodiment, the intermediate machine comprises a receiver receiving an Active Directory Federation Services claim associated with the user, via a plurality of intermediate machines. In still another embodiment, the intermediate machine further comprises an authentication component authenticating the user of the client machine responsive to a received Integrated Authentication credential. In yet another embodiment, the intermediate machine further comprises an Active Directory Federation Services component used to impersonate the client machine. In a further embodiment, the domain controller comprises a transmitter sending, to the application server, WINDOWS authentication credentials associated with the user.

BRIEF DESCRIPTION OF THE DRAWINGS

The foregoing and other objects, aspects, features, and advantages of the invention will become more apparent and better understood by referring to the following description taken in conjunction with the accompanying drawings, in which.

DETAILED DESCRIPTION OF THE INVENTION

Figure 1A:
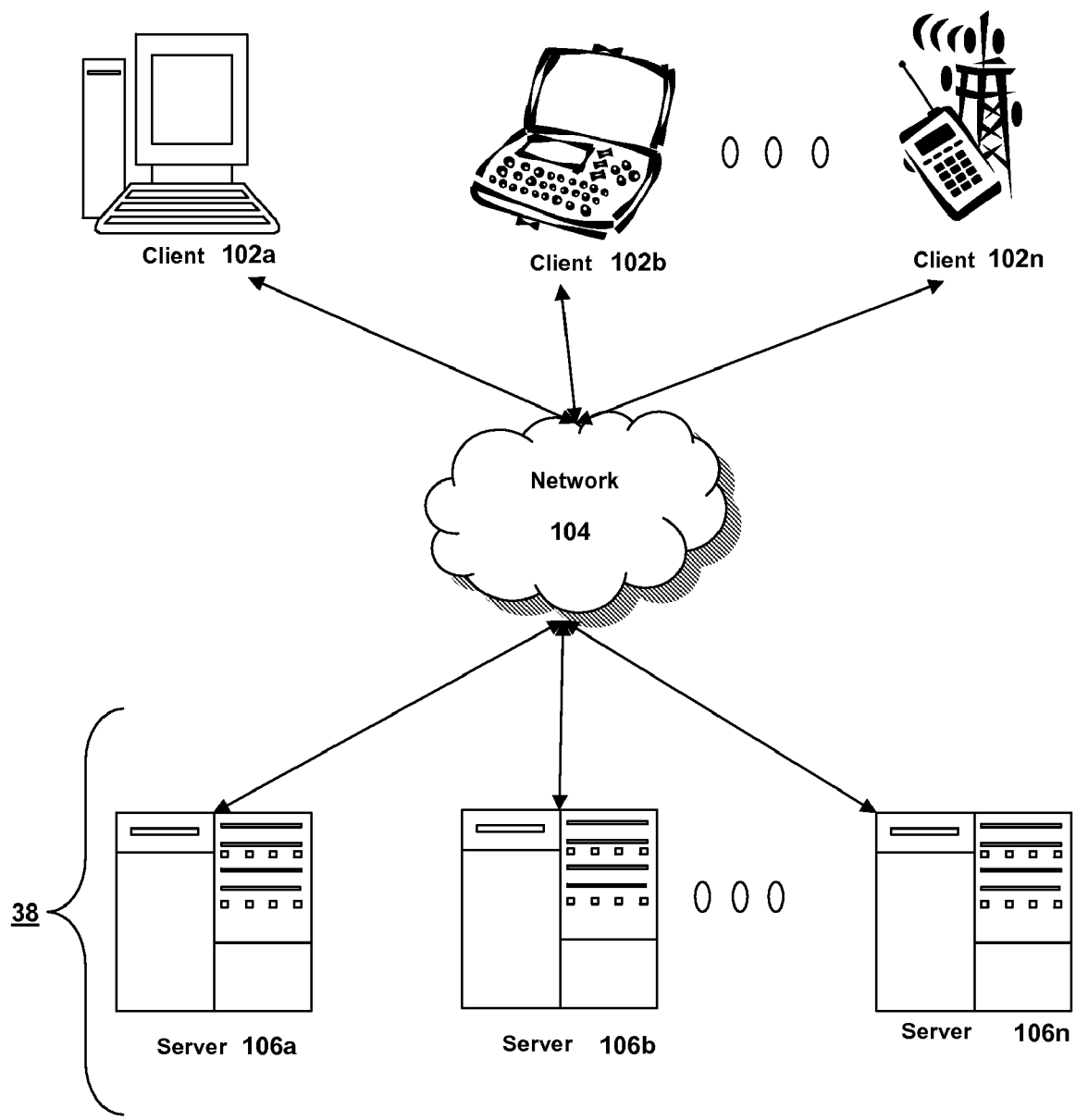
FIG. 1A is a block diagram depicting an embodiment of a network environment comprising client machines in communication with remote machines.

Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' may be a private network and a network 104 may be a public network. In another of these embodiments, a network 104 may be a private network and a network 104' a public network. In still another embodiment, networks 104 and 104' may both be private networks.

The network 104 be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols.

In one embodiment, the system may include multiple, logically-grouped servers 106. In these embodiments, the logical group of servers may be referred to as a server farm 38. In some of these embodiments, the servers 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or a metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes, client machines, endpoint nodes, or endpoints. In some embodiments, a client 102 has the capacity to function as both a client node seeking access to resources provided by a server and as a server providing access to hosted resources for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In another embodiment, the application is an ICA client, developed by Citrix Systems, Inc. of Fort Lauderdale, Fla. In still another embodiment, the application includes a Remote Desktop (RDP) client, developed by Microsoft Corporation of Redmond, Wash., or an X11 client, maintained by the open source X.org Foundation. In yet another embodiment, the server 106 may run an application, which for example, may be an application server providing email services such as Microsoft Exchange manufactured by the Microsoft Corporation of Redmond, Wash., a web or Internet server, or a desktop sharing server, or a collaboration server. In a further embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

In one embodiment, the server 106 includes a policy engine for controlling and managing the access to, selection of application execution methods and the delivery of applications. In another embodiment, the server 106 communicates with a policy engine. In some embodiments, the policy engine determines the one or more applications a user or client 102 may access. In other embodiments, the policy engine determines how the application should be delivered to the user or client 102, e.g., the method of execution. In still other embodiments, the server 106 provides a plurality of delivery techniques from which to select a method of application execution, such as a server-based computing, application streaming, or delivering the application locally to the client 102 for local execution.

In one embodiment, a client 102 requests execution of an application program and a server 106 selects a method of executing the application program. In another embodiment, the server 106 receives credentials from the client 102. In still another embodiment, the server 106 receives a request for an enumeration of available applications from the client 102. In yet another embodiment, in response to the request or receipt of credentials, the server 106 enumerates a plurality of application programs available to the client 102.

In some embodiments, the server 106 selects one of a predetermined number of methods for executing an enumerated application, for example, responsive to a policy of a policy engine. In one of these embodiments, an application delivery system on the server 106 makes the selection. In another of these embodiments, the server 106 may select a method of execution of the application enabling the client 102 to receive application-output data generated by execution of the application program on a server 106b. In still another of these embodiments, the server 106 may select a method of execution of the application enabling the client 102 to execute the application program locally after retrieving a plurality of application files comprising the application. In yet another of these embodiments, the server 106 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

Figure 1B:
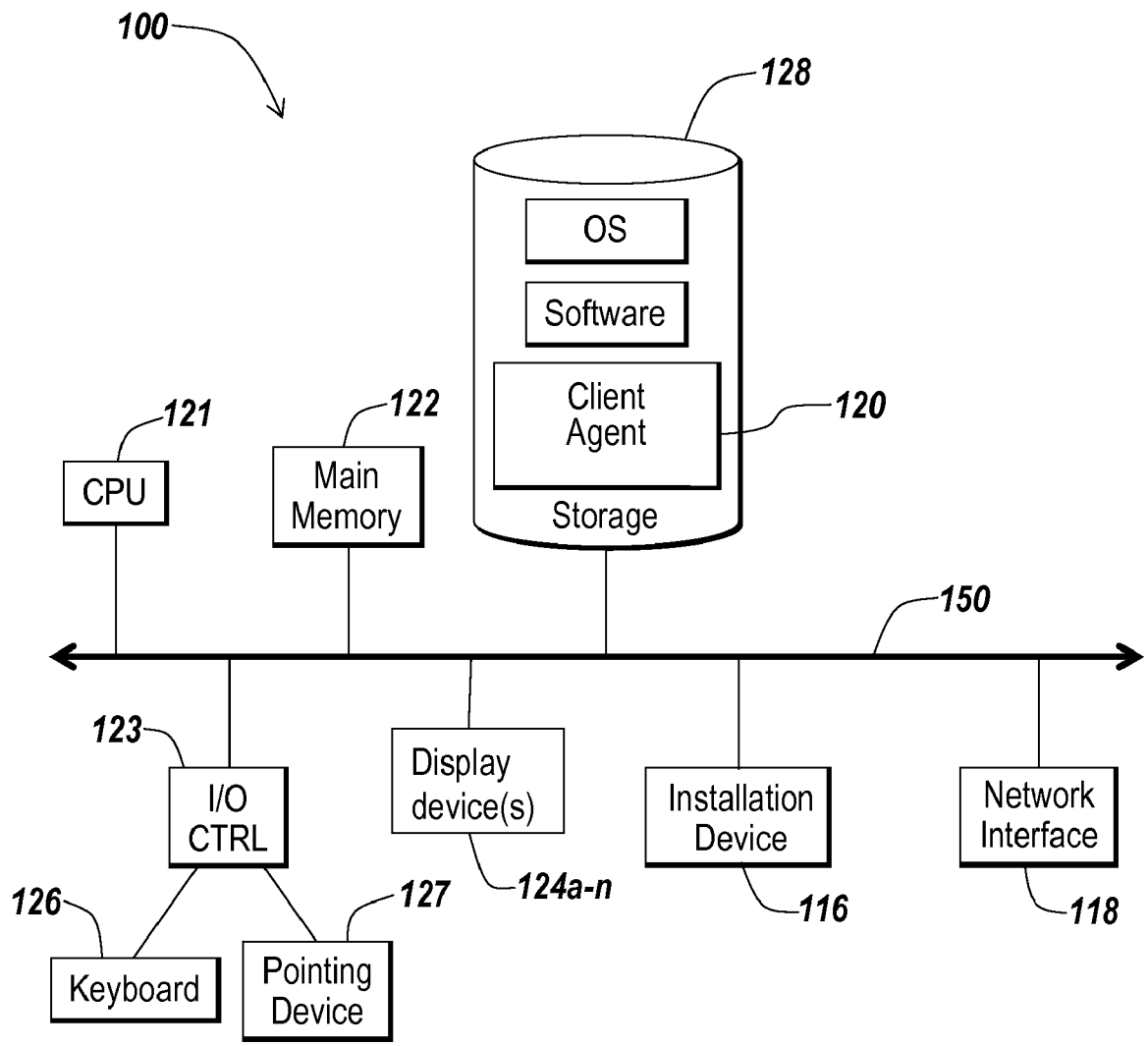
FIGS. 1B and 1C are block diagrams depicting embodiments of computers useful in connection with the methods and systems described herein.
Figure 1C:
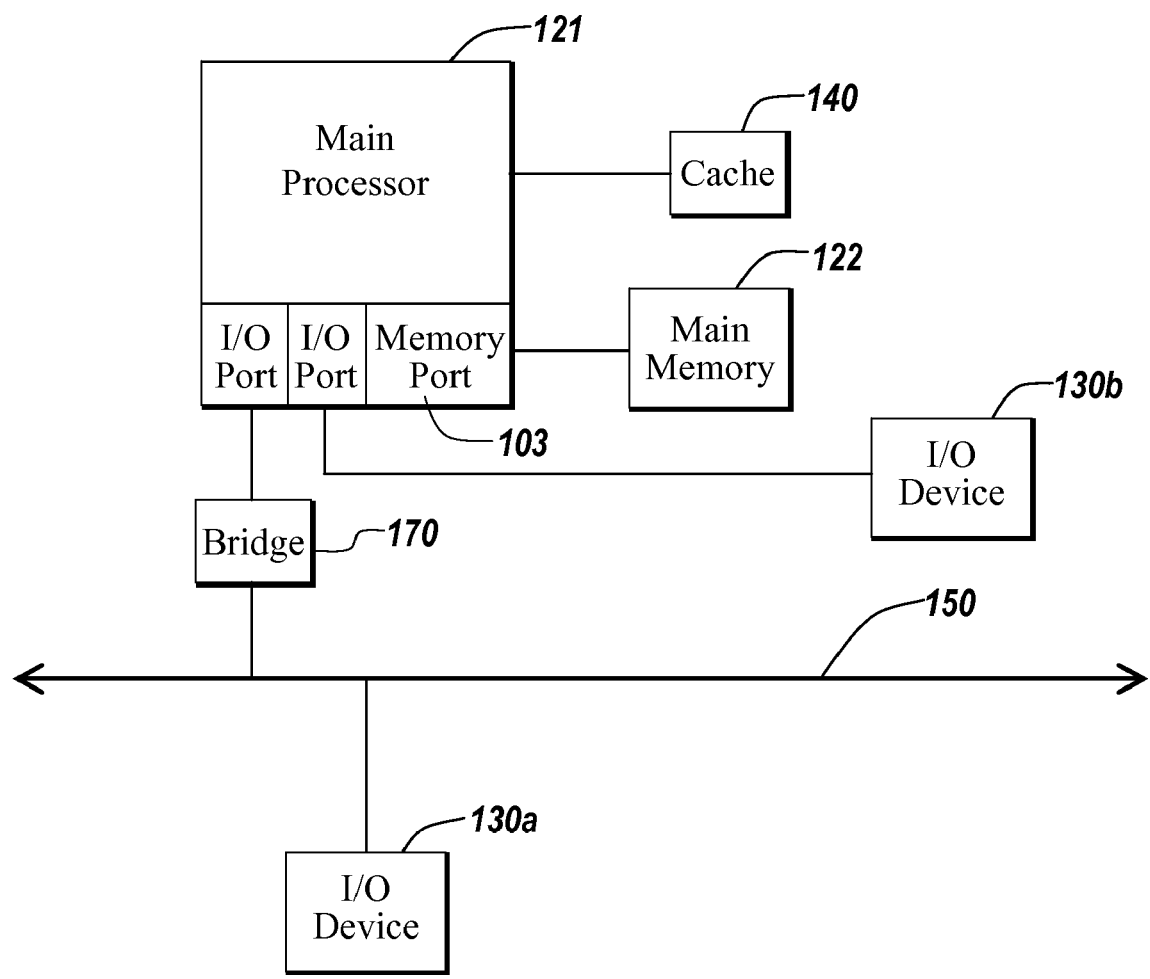

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a visual display device 124, a keyboard 126 and/or a pointing device 127, such as a mouse. As shown in FIG. 1C, each computing device 100 may also include additional optional elements, such as one or more input/output devices 130a-130b (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1B depicts an embodiment of a computing device 100 in which the processor communicates directly with main memory 122 via a memory port 103. For example, in FIG. 1B the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various busses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130*b* via HyperTransport, Rapid I/O, or InfiniBand. FIG. 1C also depicts an embodiment in which local busses and direct communication are mixed: the processor 121 communicates with I/O device 130*a* using a local interconnect bus while communicating with I/O device 130*b* directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130*a*-130*n* may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124*a*-124*n*, which each may be of the same or different type and/or form. As such, any of the I/O devices 130*a*-130*n* and/or the I/O controller 123 may comprise any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may comprise multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices, such as computing devices 100*a* and 100*b* connected to the computing device 100, for example, via a network. These embodiments may include any type of software designed and constructed to use another computer's display device as a second display device 124*a* for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In some embodiments, the computing device 100 may have different processors, operating systems, and input devices consistent with the device. For example, in one embodiment the computing device 100 is a Treo 180, 270, 600, 650, 700p or 700w smart phone manufactured by Palm, Inc. In this embodiment, the Treo smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 2:
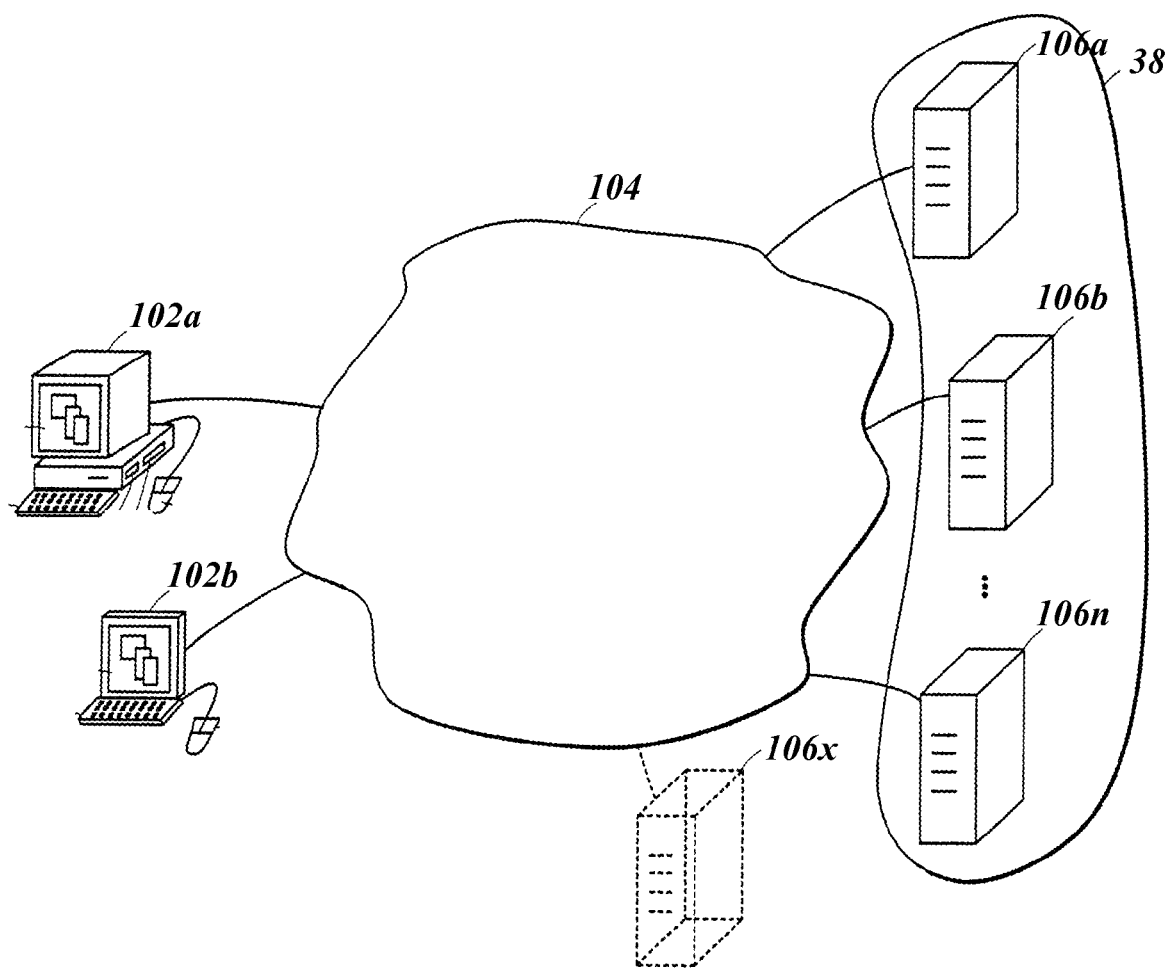
FIG. 2 is a block diagram depicting an embodiment of a network environment comprising client machines in communication with remote machines in which a plurality of the remote machines belong to a security domain.

Referring now to FIG. 2, the servers 106 may belong to the same domain. In the network 104, a domain is a sub-network comprising a group of servers 106 and clients 102 under control of one security database. A domain can include one or more "server farms." (A server farm is a group of servers that are linked together to act as a single server system to provide centralized administration.) Conversely, a server farm can include one or more domains. For servers of two different domains to belong to the same server farm, a trust relationship may need to exist between the domains. A trust relationship is an association between the different domains that allows a user to access the resources associated with each domain with just one log-on authentication.

In one embodiment, a server 106x is in a different domain than the domain to which the servers 106 belong. In another embodiment, the server 106x is in the same domain as servers 106. For either embodiment, the servers 106 can belong to one server farm, while the server 106x belongs to another server farm, or all of the application servers 106 can belong to the same server farm. When a new server is connected to the network 104, the new server either joins an existing server farm or starts a new server farm.

The clients 102 may be in a domain, or may be unconnected with any domain. In one embodiment, the client 102 is in the domain to which the servers 106 belong. In another embodiment, the client 102 is in another domain that does not include any of the servers 106. In another embodiment, the client 102 is not in any domain.

In one embodiment the client 102 is in the domain to which the servers 106 belong and a user of the client 102 provides user authentication credentials to log onto the client 102. User credentials typically include the name of the user of the client node, the password of the user, and the name of the domain in which the user is recognized. The user credentials can be obtained from smart cards, time-based tokens, social security numbers, user passwords, personal identification (PIN) numbers, digital certificates based on symmetric key or elliptic curve cryptography, biometric characteristics of the user, or any other means by which the identification of the user of the client node can be obtained and submitted for authentication.

In some embodiments, the client 102 may generate user authentication data from the user-provided credentials. In one of these embodiments, the client 102 transmits this user authentication data to a server 106. In another of these embodiments, the client credentials are not transmitted over a network, only the resulting user authentication data is transmitted by the client node. In still another of these embodiments, the server 106 may authenticate the client 102 responsive to the user authentication data.

In some embodiments, from the user authentication data and application-related information, the server 106 can also determine which resources hosted by the server farm containing server 106 are available for use by the user of the client node. In one of these embodiments, the server 106 transmits information representing the available resources to the client 102.

The user authentication performed by the server 106 may suffice to authorize the use of each hosted resource presented to the client 102, although such resources may reside at another server 106b. Accordingly, in some embodiments, when the client 102 accesses (i.e., initiates execution of) one of the hosted resources, additional input of user credentials by the user will be unnecessary to authenticate use of that application. Thus, a single entry of the user credentials can serve to determine the available applications and to authorize the launching of such applications without an additional, manual log-on authentication process by the client user.

In some embodiments, the client 102 authenticates the user to the server 106 indirectly. In one of these embodiments, the client 102 authenticates the user to an intermediate server 106x. In another of these embodiments, the intermediate server 106x indirectly authenticates the user to a server 106b. In still another of these embodiments, the intermediate server 106x provides an assertion of the user's identity to a server 106a, which trusts the intermediate server 106x. In yet another of these embodiments, the server 106a generates authentication data associated with the user and transmits the authentication data to a server 106b, which authenticates the user of the client 102, responsive to the received authentication data.

Figure 3:
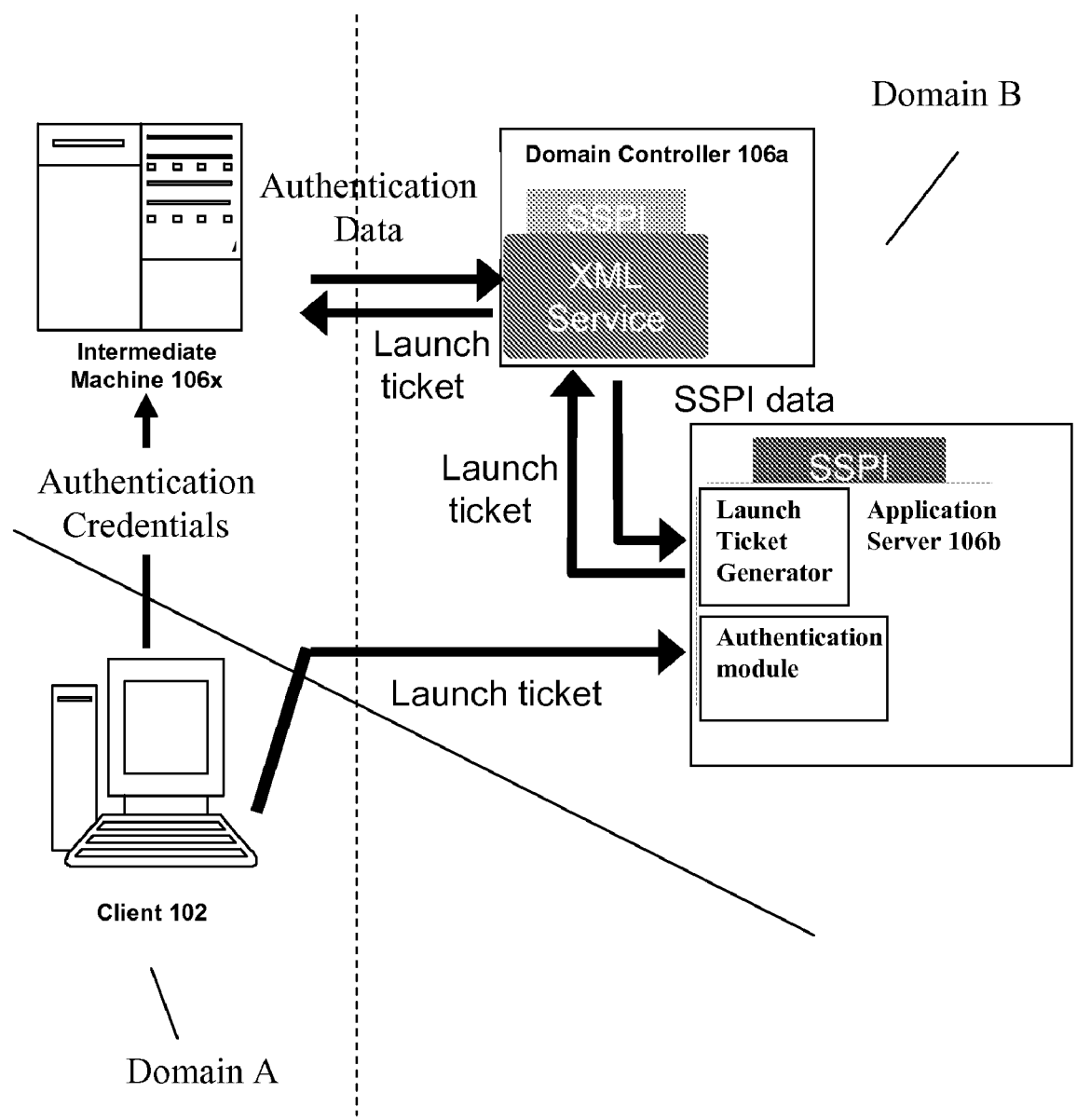
FIG. 3 is a block diagram depicting one embodiment of a system for facilitating distributed authentication.

Referring now to FIG. 3, a block diagram depicts one embodiment of a system for facilitating distributed authentication. A client machine 102, residing in a first domain, requests access to a resource residing in a second domain. An intermediate machine 106x receives, from the client machine 102, authentication credentials associated with a user of the client machine 102, authenticates the user, and impersonates the client machine 102. A domain controller 106a residing in the second domain, receives a request for access to the second domain from the intermediate machine 106x impersonating the client machine 102 and determines that the impersonated client machine 106x is trusted for delegation. An application server 106b receives, from the domain controller 106x, authentication data associated with the impersonated client machine 102, with a request for access to the resource.

A client machine 102, residing in a first domain, requests access to a resource residing in a second domain. In one embodiment, the client machine is a client 102 as described above in connection with FIGS. 1A-1C. In another embodiment, the client machine 102 requests access to an application program. In still another embodiment, the client machine 102 requests access to a file. In yet another embodiment, the client machine 102 requests access to a computing environment, such as a desktop environment, providing access to one or more application programs.

In some embodiments, the client machine 102 includes a transmitter. In one of these embodiments, the transmitter sends a request for access to a resource residing in the second domain, for a user having an account on the first domain. In another of these embodiments, the transmitter sends a request for access to a resource residing in the second domain, for a user having an account on a third domain. In still another of these embodiments, the transmitter sends a request for access to an application program executed by an application server 106b residing in the second domain. In yet another of these embodiments, the transmitter sends a request for access to a WINDOWS application program executed by an application server residing in the second domain.

In some embodiments, the client machine 102 includes a receiver. In one of these embodiments, the receiver receives, from the user, authentication credentials. In another of these embodiments, the receiver receives, from the user, authentication credentials associated with an account associated with user on the first domain. In still another of these embodiments, the receiver receives, from the user, authentication credentials associated with an account associated with user on a third domain.

In some embodiments, the client machine 102 requests access to a resource provided by an application server 106b in the second domain. In one of these embodiments, the application server 106b provides output data generated by an execution of the requested resource on the server 106. In another of these embodiments, the application server 106b makes the requested resource available via a method for application streaming. In still another of these embodiments, the application server 106b makes the requested resource available for retrieval by the client machine 102. In yet another of these embodiments, the application server 106b provides output data generated by an execution of the requested resource on a virtual machine executing on the application server 106b.

In one embodiment, a user of the client machine 102 requests access to the resource. In another embodiment, the user selects a resource to request from an enumeration of available resource displayed to the user by the client machine 102. In some embodiments, the user of the client machine 102 authenticates prior to receiving an enumeration of available resources. In one of these embodiments, the user requests the enumeration of available resources. In another of these embodiments, the user requests access to a domain, instead of a resource.

An intermediate machine 106x receives, from the client machine 102, authentication credentials associated with a user of the client machine 102, authenticates the user, and impersonates the client machine. In some embodiments, the intermediate machine 106x resides in the second domain, in which the domain controller 106a and the application server 106b reside. In other embodiments, shown in shadow in FIG. 3, the intermediate machine 106x resides in a third domain, distinct from the domain in which the client machine 102 resides and the domain in which the servers 106a and 106b resides. In still other embodiments, the intermediate machine 106x comprises a machine trusted for delegation by the domain controller 106a. In yet other embodiments, an administrator designates the intermediate machine 106x as a machine trusted for delegation. In one of these embodiments, the intermediate machine 106x is listed in a directory, such as an Active Directory, for example, as a machine trusted for delegation.

In one embodiment, the user provides authentication credentials to the client machine. Received authentication credentials can include username-password combinations, graphical password data, data derived from time-based tokens such as the SecurID line of tokens manufactured by RSA Security Inc. of Bedford, Mass., challenge-response data, information from smart cards, and biometric information such as fingerprints, voiceprints, or facial features. In another embodiment, the client machine 102 transmits the authentication credentials to the intermediate machine 106x.

In one embodiment, the user provides authentication credentials associated with an account the user has in a domain. In another embodiment, the user has an account in the first domain, the domain in which the client machine 102 resides. In still another embodiment, the user has an account in a third domain, in which neither the resource nor the client machine 102 reside.

In some embodiments, the intermediate machine 106x comprises a receiver. In one of these embodiments, the receiver receives, from the client machine, authentication credentials associated with the user, via a plurality of intermediate machines. In another of these embodiments, the receiver receives an Active Directory Federation Services claim or assertion associated with the user, via a plurality of intermediate machines. In other embodiments, the intermediate machine 106x comprises a web server using Active Directory Federation Services to authenticate the user of the client machine 102. In still other embodiments, the intermediate machine 106x comprises an authentication component for authenticating the user of the client machine 102 using ADFS.

In some embodiments, the intermediate machine 106x comprises an authentication component authenticating the user of the client machine 102 via an Integrated Authentication technique, in which the client machine 102 transmitted hashed user authentication credentials to the intermediate machine 106x. In other embodiments, the intermediate machine 106x comprises an authentication component authenticating the user of the client machine 102 responsive to a received Integrated Authentication credential. In one of these embodiments, the intermediate machine 106x authenticates the user of the client machine 102 responsive to an HMAC-SHA1 keyed hash of authentication credentials. In another of these embodiments, the intermediate machine 106x authenticates the user of the client machine 102 responsive to an HMAC-SHA-256 keyed hash of the authentication credentials. In still another of these embodiments, the intermediate machine 106x authenticates the user of the client machine 102 responsive to an HMAC-MD5 keyed hash of the authentication credentials.

In some embodiments, the intermediate machine 106x comprises an authentication module, which receives user authentication credentials for the purposes of authenticating a user to the client machine 102, a server 106, or both. For example, in WINDOWS-based environments, the authentication module may be provided by the MSGINA dynamically-linked library. In other embodiments, for example, in Unix-based environments, the authentication module may be provided by the Unix Pluggable Authentication Manager, using the pam_krb module. In still other embodiments, the authentication module may be provided by the Unix kinit command program.

In other embodiments, the intermediate machine 106x also includes a security service. In one of these embodiments, an authentication module and a security service are provided as the same dynamically-linked library. In another of these embodiments, the security service provides security services to modules and applications on the intermediate machine 106x, such as authentication to the client machine 102 and authentication to remote servers 106 or network services. For example, the security service, which may be the GSSAPI specified by the Internet Engineering Task Force (IETF) or the SSPI manufactured by Microsoft Corporation of Redmond, Wash., may obtain a Kerberos ticket in response to receipt of the user authentication credentials and use this ticket to obtain additional Kerberos tickets to authenticate the user to remote hosts or network services, at the request of modules or applications on the client machine 10. The security service may then generate user authentication data using these Kerberos tickets if needed for remote authentication. In still another of these embodiments, the security service may generate the user authentication data using an external authentication service, such as a Key Distribution Center in a Kerberos environment or Active Directory in a Windows-based environment. In yet another of these embodiments, a security service generates user authentication data, e.g., Kerberos ticket and associated Kerberos authenticator, from received authentication credentials. In a further of these embodiments, the intermediate machine 106x may transmit the generated authentication data to a server 106 for remote authentication of the user.

In some embodiments, the intermediate machine 106x receives an assertion associated with the user. In one of these embodiments, the intermediate machine 106x includes functionality for authenticating the user of the client machine 102, responsive to the received assertion. In another of these embodiments, the intermediate machine 106x receives the assertion from a third party component, such as a Microsoft Active Directory Federation Services (ADFS) component. In some embodiments, a component, such as an ADFS component, enables users from one organization to access Web resources in another organization without providing credentials. In one of these embodiments, the component uses technology such as a Security Assertions Markup Language (SAML) and a Web Services Federation Language (WS-Federation). SAML and WS-Federation allow one organization (A) to trust another organization (B) to authenticate users. Organization B receives an assertion from organization A that identifies the user as an authorized user in organization A, and, since organization B trusts organization A, organization B accepts the assertion and grants the user access to organization B.

In some embodiments, the intermediate machine 106x transmits received authentication credentials to the domain controller 106a. In one of these embodiments, the received authentication credentials include ADFS assertions. In other embodiments, however, the domain controller 106a does not accept assertions from third-party components. In still other embodiments, the server 106 providing access to the requested resource does not accept assertions from third-party components. In yet other embodiments, an authentication server in the second domain requires authentication credentials, or authentication data, from the client 102 requesting access to the second domain. In some of these embodiments, therefore, the intermediate machine 106x impersonates the client 102 to authenticate the user of the client machine 102 and obtain authorization for the user of the client 102 to access resources on the second domain.

In some embodiments, the intermediate machine 106x requests access to the second domain from the domain controller 106x on behalf of the user of the client machine 102. In one of these embodiments, the intermediate machine 106x impersonates the client machine 102 when requesting access to the second domain from the domain controller 106a. In another of these embodiments, the intermediate machine 106x comprises an Active Directory Federation Services (ADFS) component. In still another of these embodiments, the intermediation machine 106x uses the ADFS component to impersonate the client 102. In yet another of these embodiments, the intermediate machine 106x, impersonating the client machine 102, uses Integrated Authentication to authenticate the user of the client machine 102 to the domain controller 106a.

A domain controller 106a residing in the second domain, receives a request for access to the second domain from the intermediate machine impersonating the client machine and determines that the impersonated client machine is trusted for delegation. In one embodiment, the domain controller 106a comprises an XML service. In another embodiment, the intermediate machine 106x communicates with the XML service. In still another embodiment, the intermediate machine 106x uses Integrated Authentication to authenticate the user with the XML service. In yet another embodiment, the domain controller 106a comprises an XML service used to communicate with the application server 106b.

In one embodiment, the domain controller 106a receives the request for access to the second domain from the intermediate machine 106x and verifies that the intermediate machine 106x is trusted for delegation. In another embodiment, the intermediate machine 106x is trusted for protocol transition if it is trusted for delegation. In still another embodiment, the domain controller 106a generates authentication data for the user of the client machine 102, in response to the request for access from the intermediate machine 106x impersonating the client machine 102. In yet another embodiment, the domain controller 106a generates a ticket, such as a Kerberos ticket, in response to the request from the intermediate machine 106x.

In some embodiments, the domain controller 106a includes a security service. In one of these embodiments, an authentication module and a security service are provided as the same dynamically-linked library. In another of these embodiments, the security service provides security services to modules and applications on the domain controller 106a, such as authentication for clients requesting access to resources to remote hosts (application server 106b, for example) or network services. For example, the security service, which may be the GSSAPI specified by the Internet Engineering Task Force (IETF) or the SSPI manufactured by Microsoft Corporation of Redmond, Wash., may obtain a Kerberos ticket in response to receipt of the user authentication credentials and use this ticket to obtain additional Kerberos tickets to authenticate the user to remote hosts or network services, at the request of modules or applications in communication with the domain controller 106a. In still another of these embodiments, the domain controller 106a obtains a Kerberos ticket in response to receipt of an assertion from a trusted machine, such as a machine trusted for delegation, or trusted for protocol transition. The security service may then generate user authentication data using these Kerberos tickets if needed for remote authentication. In yet another of these embodiments, the security service may generate the user authentication data using an external authentication service, such as a Key Distribution Center in a Kerberos environment or Active Directory in a Windows-based environment. In a further of these embodiments, the domain controller 106a may transmit the generated authentication data to a server 106 for remote authentication of the user. In one embodiment, the domain controller 106a comprises a transmitter sending, to the application server, a generated Kerberos ticket. In another embodiment, the domain controller 106a comprises a transmitter sending, to the application server 106b, generated WINDOWS authentication credentials associated with the user.

An application server 106b receives, from the domain controller 106a, authentication credentials associated with the impersonated client machine 102 with a request for access to the resource on the second domain and transmits, to the intermediate machine 106x impersonating the client machine 102, a launch ticket uniquely identifying a logon token. In some embodiments, the application server 106b comprises a transmitter. In one of these embodiments, the transmitter sends the launch ticket to the intermediate machine 106x. In another of these embodiments, the transmitter sends the launch ticket to the domain controller 106a. In other embodiments, the domain controller 106a comprises a transmitter sending the launch ticket to the intermediate machine 106x. In still other embodiments, the intermediate machine 106x comprises a transmitter sending the launch ticket to the client machine 102.

In some embodiments, the application server 106b includes a security service. In one of these embodiments, an authentication module and a security service are provided as the same dynamically-linked library. In another of these embodiments, the security service provides security services to modules and applications on the application server 106b, such as authentication for clients requesting access to resources to remote hosts (application server 106b, for example) or network services. For example, the security service, which may be the GSSAPI specified by the Internet Engineering Task Force (IETF) or the SSPI manufactured by Microsoft Corporation of Redmond, Wash., may obtain a Kerberos ticket in response to receipt of the user authentication credentials or authentication data and use this ticket to obtain additional Kerberos tickets to authenticate the user to remote hosts or network services, at the request of modules or applications in communication with the application server 106b.

In some embodiments, the application server 106b passes the received authentication data to a security service. If the security service is able to verify the data, the security service generates an access token representing a logon session for the user, allowing the user to authenticate to the application server 106b without resubmitting authentication credentials. In one embodiment, an access token is a data object that includes, among other things, a locally unique identifier (LUID) for the logon session. If the security service is not able to verify the data, the user is prompted to resubmit authentication credentials.

The client machine 102 provides the launch ticket to the application server 106b to access the resource residing in the second domain. In one embodiment, the client machine 102 includes a transmitter sending the launch ticket directly to the application server 106b. In some embodiments, after the server 106b has authenticated the user, the application server 106b presents an enumeration of resources available to the user. In some of these embodiments, the application server 106b may create a page describing a display of resources, hosted by a plurality of application servers 106b, available to the user of the client 102. The application server 106b may then transmit the created page to the client 102 for display and receive from the client 102 a request to access one of the hosted resources. In other embodiments, the client 102 displays the enumeration prior to authentication of the user. In one of these embodiments, the client 102 receives the launch ticket from the intermediate machine 106x and transmits the launch ticket to the application server 106b to access a previously-requested resource residing in the second domain.

In some embodiments, the application server 106b executes the resource requested by the client 102. In one of these embodiments, the application server 106b executes a virtual machine executing the resource requested by the client 102. In other embodiments, the application server 106b identifies a server 106n providing access to the resource for the client 102. In one of these embodiments, the application server 106b provides the client 102 with information for establishing a connection to the application server 106n to access the resource. In another of these embodiments, the application server 106b receives output data generated by an execution of the resource on the application server 106b and transmits the received output data to the client 102. In other embodiments, the application server 106b comprises a transmitter sending output data generated by an execution of the resource, on the application server 106b or on an application server 106n, to the client 102.

Figure 4:
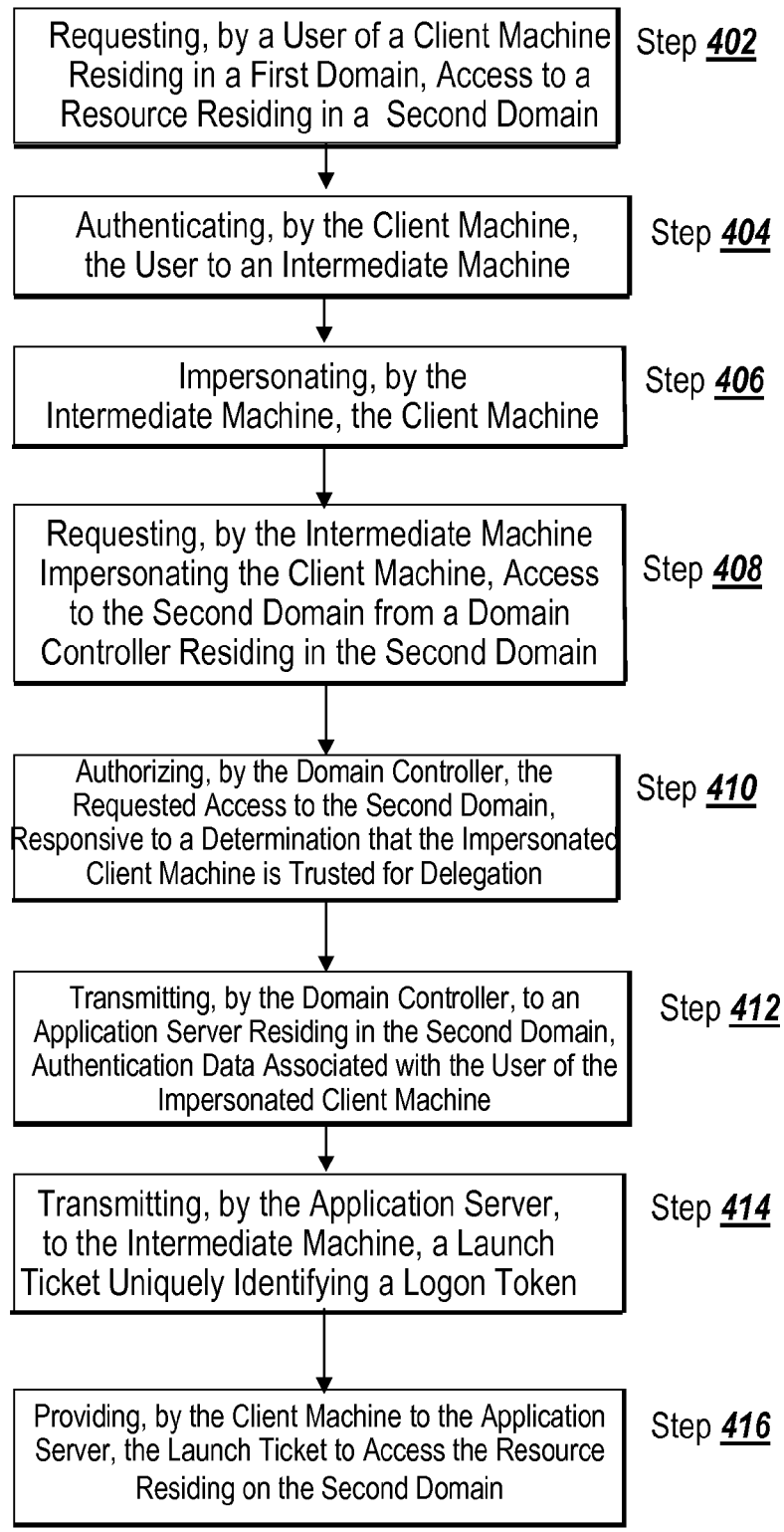
FIG. 4 is a flow diagram depicting one embodiment of the steps taken in a method for facilitating distributed authentication.

Referring now to FIG. 4, a flow diagram depicts one embodiment of the steps taken in a method for facilitating distributed authentication. A user of a client machine residing in a first domain requests access to a resource residing in a second domain (step 402). The client machine authenticates the user to an intermediate machine (step 404). The intermediate machine impersonates the client machine (step 406). The intermediate machine impersonating the client machine requests access to the second domain from a domain controller residing in the second domain (step 408). The domain controller authorizes the requested access to the second domain, responsive to a determination that the impersonated client machine is trusted for delegation (step 410). The domain controller transmits, to an application server residing in the second domain, authentication data associated with the user of the impersonated client machine (step 412). The application server transmits, to the intermediate machine, a launch ticket uniquely identifying a logon token (step 414). The client machine provides, to the application server, the launch ticket to access the resource residing in the second domain (step 416).

A user of a client machine residing in a first domain requests access to a resource residing in a second domain (step 402). In one embodiment, the user, having an account in a third domain, requests, via the client machine residing in the first domain, access to the resource residing in the second domain. In another embodiment, the user, having an account in the first domain, requests, via the client machine residing in the first domain, access to the resource residing in the second domain. In still another embodiment, the user of the client machine residing in the first domain requests access to a WINDOWS application program executed by an application server residing in the second domain.

In one embodiment, the user of the client machine provides authentication credentials to the client machine, the authentication credentials associated with an account associated with the user on the first domain. In another embodiment, the user of the client machine provides authentication credentials to the client machine, the authentication credentials associated with an account associated with the user on a third domain.

The client machine authenticates the user to an intermediate machine (step 404). In one embodiment, the client machine authenticates the user to an intermediate machine using Active Directory Federation Services (ADFS). In another embodiment, the client machine uses Active Directory Federation Services to authenticate the user to an intermediate machine comprising a web server. In still another embodiment, the client machine transmits authentication credentials associated with the user to the intermediate machine.

In one embodiment, the client machine authenticates the user to the intermediate machine via an Integrated Authentication technique. In another embodiment, the client machine authenticates the user to the intermediate machine by providing an Integrated Authentication credential.

In some embodiments, the client machine transmits authentication credentials associated with the user to the intermediate machine via a plurality of intermediate machines. In one of these embodiments, the client machine transmits an Active Directory Federation Services claim, or assertion, associated with the user to the intermediate machine, via a plurality of intermediate machines. In another of these embodiments, the intermediate machine 106x comprises a web server. In still another of these embodiments, a first intermediate machine in the plurality of intermediate machines may be referred to as an account partner server. In yet another of these embodiments, a second intermediate machine in the plurality of intermediate machines may be referred to as a resource partner.

In one of these embodiments, the client machine requests, from a web server, access to a web page enumerating a plurality of resources available to the user of the client machine. In another of these embodiments, the web server redirects the request to a first intermediate machine. In still another of these embodiments, the first intermediate machine redirects the request to a second intermediate machine. In yet another of these embodiments, the second intermediate machine requests authentication credentials from the user of the client machine.

In one of these embodiments, the second intermediate machine transmits the received authentication credentials associated with the user of the client machine to the first intermediate machine. In another of these embodiments, the second intermediate machine transmits a plurality of Active Directory Federation Services claims, or assertions, to the first intermediate machine, with the received authentication credentials. In still another of these embodiments, the first intermediate machine verifies the Active Directory Federation Services claims. In yet another of these embodiments, the first intermediate machine authorizes the user of the client machine.

In one of these embodiments, the first intermediate machine transmits, to the web server, the request for access to the web page enumerating the plurality of available application programs. In another of these embodiments, the first intermediate machine transmits, to the web server, the verified Active Directory Federation Services claims with the request for access to the web page. In still another of these embodiments, the client machine accesses the web server and the web server successfully authenticates the user of the client machine. In some embodiments, the client machine provides additional authentication to access a resource enumerated by the web page provided by the web server.

The intermediate machine impersonates the client machine (step 406). In some embodiments, the intermediate machine uses an Active Directory Federation Services component to impersonate the client machine. In other embodiments, the intermediate machine receives an assertion associated with the user of the client machine from a third-party component. In one of these embodiments, the intermediate machine authenticates the user of the client machine responsive to the received assertion. In another of these embodiments, the intermediate machine impersonates the client machine to request access to the second domain on behalf of the user of the client machine, responsive to the received request and the received assertion. In still other embodiments, the intermediate machine impersonates the client machine to request access to the second domain on behalf of the user of the client machine, responsive to the received request and the received authentication credentials.

The intermediate machine impersonating the client machine requests access to the second domain from a domain controller residing in the second domain (step 408). In one embodiment, the intermediate machine generates authentication data associated with the user. In another embodiment, the intermediate machine transmits the request for access to the second domain with the generated authentication data to the domain controller. In still another embodiment, the intermediate machine requests transmission of WINDOWS authentication credentials associated with the user of the client machine to the application server providing access to the requested resource.

The domain controller authorizes the requested access to the second domain, responsive to a determination that the impersonated client machine is trusted for delegation (step 410). In one embodiment, the domain controller determines that an administrator marked the intermediate machine as a machine trusted for delegation. In another embodiment, the domain controller generates authentication data in response to requests by machines trusted for delegation without requiring transmission of authentication credentials from the machines trusted for delegations. In some embodiments, the machines trusted for delegation perform protocol transition when the machines authenticate a user, responsive to received authentication credentials, and acquire authentication data from an authentication server in a different domain than the user's account or the client machine from which the user requests authentication, without providing authentication credentials to the authentication server.

The domain controller transmits, to an application server residing in the second domain, authentication data associated with the user of the impersonated client machine (step 412). In one embodiment, the domain controller transmits, to the application server, a ticket, such as a Kerberos ticket, associated with the user. In another embodiment, the domain controller transmits, to the application server, WINDOWS authentication credentials associated with the user.

The application server transmits, to the intermediate machine, a launch ticket uniquely identifying a logon token (step 414). In one embodiment, the application server receives the transmitted authentication data from the domain controller. In another embodiment, the application server transmits the authentication data to a security component, such as an SSPI component, for authentication of the user associated with the authentication data. In still another embodiment, the application server receives a logon token from the security component upon successful authentication of the user by the security component. In yet another embodiment, the application server generates a launch ticket uniquely identifying the received logon token.

In some embodiments, the logon token generated by the SSPI component and received by the application server only has network logon rights. In one embodiment, for the user of the client machine to access the requested resource, the user of the client machine requires access to a token with interactive logon rights. For example, to be usable for a Terminal Services session, a logon token with interactive logon rights is needed. There are alternative ways of converting a network logon token to an interactive token.

In one embodiment, the Windows Native API DDK function NtCreateToken creates a logon token that can be used for a Terminal Services session. This function is present in Microsoft Windows 2000 and Microsoft Windows 2003, and requires the SE_CREATE_TOKEN privilege to be able to call it. An authentication module, which may be referred to as CTXGINA, runs under the SYSTEM account which has the SE_CREATE_TOKEN privilege. For embodiments using Microsoft Windows 2003, WinLogon permanently disables the SE_CREATE_TOKEN privilege from GINAs. A 'loopback' (but networkless) logon using SSPI is performed to generate a logon token for SYSTEM that has the SE_CREATE_TOKEN privilege. CTXGINA then impersonates that token, calls NtCreateToken to create a logon token with interactive logon rights, reverts back from the impersonation and discards the token.

In another embodiment, a custom Windows authentication package is used to convert a network logon token to an interactive token in CtxGina. Windows authentication packages have documented access to the CreateToken function which behaves in the same way as NtCreateToken. A custom Windows authentication package can use CreateToken to convert the network logon token to an interactive one in CtxGina.

For embodiments in which the application server operates under control of a Unix-based operating system, if the application server verifies the authentication data it receives from the domain controller, the application server will grant the user access to the resources. In these embodiments, the application server does not generate an access token.

In embodiments in which the application server receives a logon token and generates a launch ticket, the application server transmits the launch ticket to the intermediate machine. In one embodiment, the application server transmits the launch ticket to the domain controller. In another embodiment, the domain controller transmits the launch ticket to the intermediate machine. In still another embodiment, the intermediate machine transmits the launch ticket to the client machine.

The client machine provides, to the application server, the launch ticket to access the resource residing in the second domain (step 416). In one embodiment, the client machine provides the launch ticket directly to the application server with a request for access to the resource. In another embodiment, the client machine uses a presentation layer protocol to communicate with the application server. In still another embodiment, the client machine receives, from the application server, output data generated by an execution of the resource.

Figure 5:
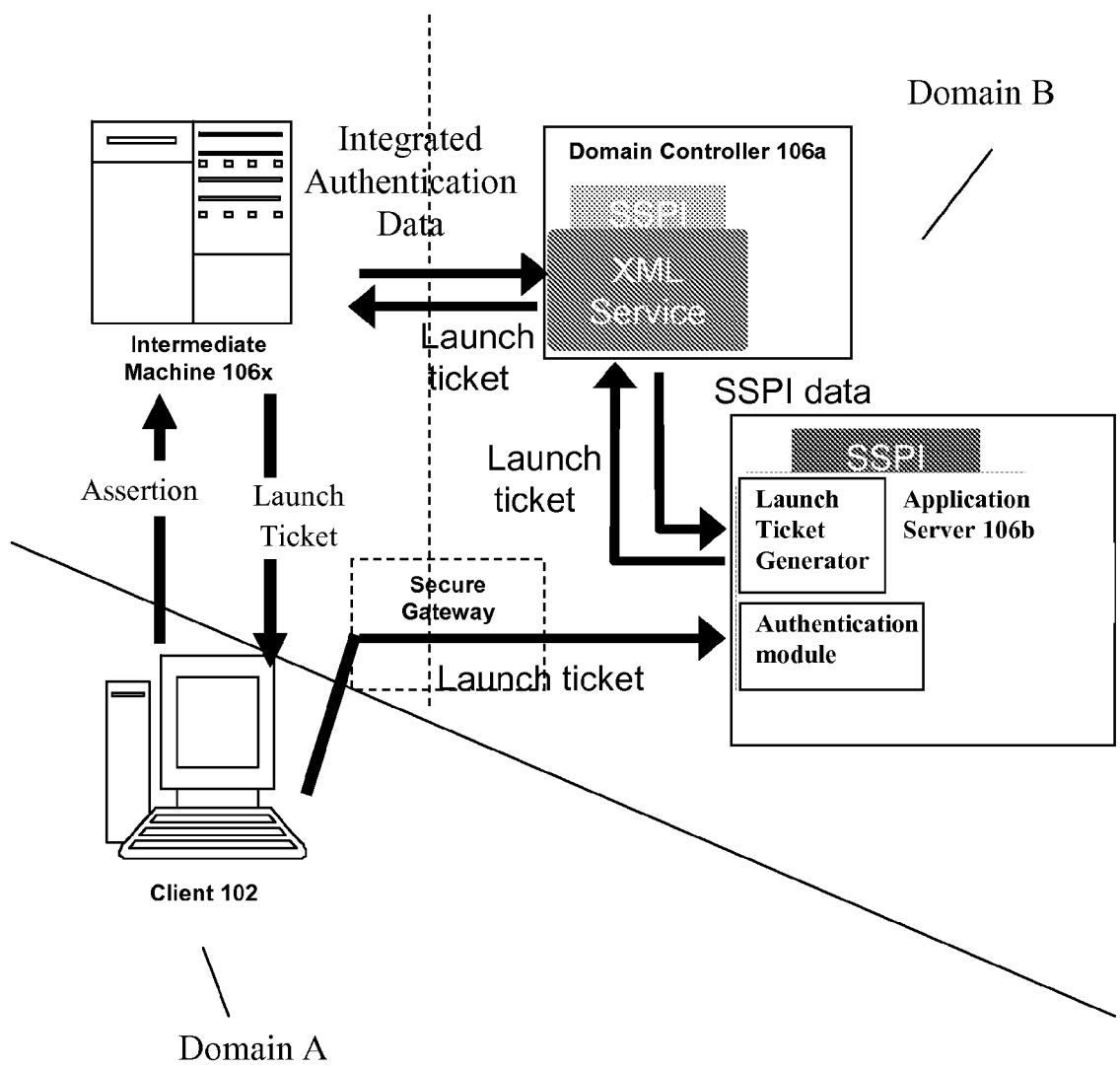
FIG. 5 is a block diagram depicting an embodiment of a system for facilitating distributed authentication.

Referring now to FIG. 5, a block diagram depicts one embodiment of a system for facilitating distributed authentication. In one embodiment, the client 102 transmits a WS-Federation assertion associated with a user of the client 102 to a web server 106*x*. In another embodiment, the client 102 uses a web browser to transmit the WS-Federation assertion to the web server 106*x*. In still another embodiment, the client 102 uses a client agent, such as an ICA, RDP, or X11 client agent to transmit the WS-Federation assertion.

In one embodiment, the web server 106*x* authenticates a user of the client 102. In another embodiment, the web server 106*x* uses an SSPI component to authenticate the user of the client 102. In still another embodiment, the web server 106*x* uses an SSPI component to generate authentication data associated with the user of the client, responsive to the WS-Federation assertion. In yet another embodiment, the web server 106*x* uses an ADFS component to authenticate the user of the client 102, responsive to the received WS-Federation assertion.

In one embodiment, the web server 106*x* transmits authentication data to a domain controller 106*a*. In another embodiment, the web server 106*x* transmits Integrated Authentication data associated with the user of the client 102 to the domain controller 106*a*. In still another embodiment, the web server 106*x* transmits authentication data to an XML service on the domain controller 106*a*. In yet another embodiment, the web server 106*x* impersonates the client 102 and transmits the authentication data with a request for access to the second domain to the domain controller 106*a*.

In one embodiment, the domain controller 106*a* receives authentication data associated with the user from the web server 106*x*, which is impersonating the client 102. In another embodiment, the domain controller 106*a* determines that the web server 106*x* is trusted for delegation. In still another embodiment, the domain controller 106*a* trusts the web server 106*x* to delegate authentication and the domain controller 106*a* authenticates the user of the client 102 without requiring authentication credentials because of the determination that the domain controller 106*a* trusts the web server 106*x*.

In one embodiment, the domain controller 106*a* generates authentication data for the user of the client 102. In another embodiment, the domain controller 106*a* uses an SSPI component to generate the authentication data. In still another embodiment, the domain controller 106*a* generates a ticket, such as a Kerberos ticket. In yet another embodiment, the domain controller 106*a* generates a WINDOWS authentication credential. In a further embodiment, the domain controller 106*a* transmits the generated authentication data to the application server 106*b*.

In one embodiment, the application server 106*b* receives the generated authentication data and authenticates the user of the client 102. In another embodiment, the application server 106*b* uses an SSPI component to authenticate the user.

In still another embodiment, the application server 106b receives a logon token authorizing the authenticated user to access a resource on the second domain. In yet another embodiment, the application server 106b transmits to the web server 106x a launch ticket uniquely identifying the logon token. In some embodiments, the application server 106b generates a token having interactive access rights.

In one embodiment, the application server 106b transmits the launch ticket to the domain controller 106a, which transmits the launch ticket to the web server 106x, which transmits the launch ticket to the client 102. In another embodiment, when the user requests access to the resource, the client 102 transmits the launch ticket directly to the application server 106b. In some embodiments, the client 102 connects to a gateway upon receiving a user request for access to a resource. In one of these embodiments, the client 102 transmits the launch ticket to the application server 106b via the gateway. Upon receiving the launch ticket, the application server 106 provides the user of the client 102 with access to the requested resource.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of methods and systems for facilitating distributed authentication, it will now become apparent to one of skill in the art that other embodiments incorporating the concepts of invention may be used. Therefore, the invention should not be limited to certain embodiments, but rather should be limited only by the spirit and scope of the following claims.

What is claimed is:

1. A method for facilitating distributed authentication, the method comprising the steps of:
    (a) requesting, by a user of a client machine residing in a first domain, access to a resource residing in a second domain;
    (b) authenticating, by the client machine, the user to an intermediate machine;
    (c) impersonating, by the intermediate machine, the client machine using a received assertion associated with the user of the client machine from a third party component;
    (d) requesting, by the intermediate machine impersonating the client machine, access to the second domain from a domain controller residing in the second domain;
    (e) authorizing, by the domain controller, the requested access to the second domain, responsive to a determination that the impersonated client machine is trusted for delegation;
    (f) transmitting, by the domain controller, to an application server residing in the second domain, authentication data associated with the impersonated client machine;
    (g) transmitting, by the application server, to the intermediate machine, a launch ticket uniquely identifying a logon token; and
    (h) providing, by the client machine to the application server, the launch ticket to access the resource residing in the second domain.

2. The method of claim 1, further comprising the step of receiving, by the client machine, from the application server, output data generated by an execution of the resource.

3. The method of claim 1, wherein step (a) further comprises requesting, by a user having an account in a third domain, via the client machine residing in the first domain, access to a resource residing in the second domain.

4. The method of claim 1, wherein step (a) further comprises requesting, by the user of the client machine residing in the first domain, access to an application program executed by an application server residing in the second domain.

5. The method of claim 1, wherein step (a) further comprises requesting, by the user of the client machine residing in the first domain, access to a WINDOWS application program executed by an application server residing in the second domain.

6. The method of claim 1, wherein step (a) further comprises providing, by the user of the client machine, authentication credentials to the client machine, the authentication credentials associated with an account associated with the user in the first domain.

7. The method of claim 1, wherein step (a) further comprises providing, by the user of the client machine, authentication credentials to the client machine, the authentication credentials associated with an account associated with the user in a third domain.

8. The method of claim 1, wherein step (b) further comprises authenticating, by the client machine, the user to an intermediate machine using Active Directory Federation Services.

9. The method of claim 1, wherein step (b) further comprises authenticating, by the client machine, the user to a web server using Active Directory Federation Services.

10. The method of claim 1, wherein step (b) further comprises transmitting, by the client machine, authentication credentials associated with the user to the intermediate machine, via a plurality of intermediate machines.

11. The method of claim 1, wherein step (b) further comprises transmitting, by the client machine, an Active Directory Federation Services claim associated with the user to the intermediate machine, via a plurality of intermediate machines.

12. The method of claim 1, wherein step (b) further comprises authenticating, by the client machine, the user to an intermediate machine via an Integrated Authentication technique.

13. The method of claim 1, wherein step (b) further comprises authenticating, by the client machine, the user to an intermediate machine by providing an Integrated Authentication credential.

14. The method of claim 1, wherein step (c) further comprises using, by the intermediate machine, an Active Directory Federation Services component to impersonate the client machine.

15. The method of claim 1, wherein step (f) further comprises transmitting, by the domain controller, to the application server, WINDOWS authentication credentials associated with the user.

16. The method of claim 1, wherein step (g) further comprises transmitting, by the intermediate machine to the client machine, the launch ticket.

17. A system for facilitating distributed authentication comprising:
    a client machine, residing in a first domain, requesting access to a resource residing in a second domain;
    an intermediate machine receiving, from the client machine, authentication credentials associated with a user of the client machine, authenticating the user, and impersonating the client machine using a received assertion associated with the user of the client machine from a third party component;

a domain controller residing in the second domain, receiving a request for access to the second domain from the intermediate machine impersonating the client machine and determining that the impersonated client machine is trusted for delegation; and an application server receiving, from the domain controller, authentication data associated with the user of the impersonated client machine with a request for access to the resource on the second domain and transmitting, to the intermediate machine impersonating the client machine, a launch ticket uniquely identifying a logon token;

wherein the client machine provides the launch ticket to the application server to access the resource residing in the second domain.

18. The system of claim 17, wherein the application server further comprises a transmitter sending output data generated by an execution of the resource to the client machine.

19. The system of claim 17, wherein the client machine further comprises a transmitter sending a request for access to a resource residing in the second domain, for a user having an account on the first domain.

20. The system of claim 17, wherein the client machine further comprises a transmitter sending a request for access to a resource residing in the second domain, for a user having an account on a third domain.

21. The system of claim 17, wherein the client machine further comprises a transmitter sending a request for access to an application program executed by an application server residing in the second domain.

22. The system of claim 17, wherein the client machine further comprises a transmitter sending a request for access to a WINDOWS application program executed by an application server residing in the second domain.

23. The system of claim 17, wherein the client machine further comprises a receiver receiving, from the user, authentication credentials associated with an account associated with the user on the first domain.

24. The system of claim 17, wherein the client machine further comprises a receiver receiving, from the user, authentication credentials associated with an account associated with the user on a third domain.

25. The system of claim 17, wherein the intermediate machine further comprises an authentication component for authenticating the user of the client machine using Active Directory Federation Services.

26. The system of claim 17, wherein the intermediate machine further comprises a web server using Active Directory Federation Services to authenticate the user of the client machine.

27. The system of claim 17, wherein the intermediate machine further comprises a receiver receiving, from the client machine, authentication credentials associated with the user, via a plurality of intermediate machines.

28. The system of claim 17, wherein the intermediate machine further comprises a receiver receiving an Active Directory Federation Services claim associated with the user, via a plurality of intermediate machines.

29. The system of claim 17, wherein the intermediate machine further comprises an authentication component authenticating the user of the client machine via an Integrated Authentication technique.

30. The system of claim 17, wherein the intermediate machine further comprises an authentication component authenticating the user of the client machine responsive to a received Integrated Authentication credential.

31. The system of claim 17, wherein the intermediate machine further comprises an Active Directory Federation Services component used to impersonate the client machine.

32. The system of claim 17, wherein the domain controller further comprises a transmitter sending, to the application server, WINDOWS authentication credentials associated with the user.

33. The system of claim 17, wherein the intermediate machine further comprises a transmitter sending, to the client machine, the launch ticket.

* * * * *